THERMAL DEVELOPING APPARATUS

Filed June 8, 1964

INVENTORS
RICHARD E. SMITH
ROBERT L. BOSTON

BY Henry W. Coughlin
Walter D. Hansel
ATTORNEYS

United States Patent Office 3,301,157
Patented Jan. 31, 1967

3,301,157
THERMAL DEVELOPING APPARATUS

Richard E. Smith, Webster, and Robert L. Boston, Vestal, N.Y., assignors to General Aniline & Film Corporation, New York, N.Y., a corporation of Delaware Filed June 8, 1964, Ser. No. 373,202
4 Claims. (Cl. 95—89)

The present invention relates to a thermal developing apparatus and method and, more particularly, to a thermal apparatus and method suitable for developing diazo type photographic materials. The invention, however, is not limited to the photographic art and is capable of utilization in other fields where carefully controlled heating of sheet material under certain specified conditions is desirable or necessary.

In the prior art, processes for utilizing diazo materials for photography are many and varied. The process has been widely applied to systems for copying documents for use in offices as well as in larger industrial plants. This copying process has been applied in various forms and the use of various forms of radiation for development purposes also has been suggested.

In general aspects the diazo photographic method is based on the use of certain diazo compounds which have the property of decomposing when exposed to the action of certain types of actinic radiation. Upon decomposition materials are produced which are essentially colorless and which remain so regardless of subsequent or further exposure to light or other forms of radiation. On the other hand, certain of these compositions, when not exposed to actinic radiation appropriate for their decomposition, have the property of combining with other initially colorless materials known as couplers to produce, upon coupling, intense colored or black dyes. These dyes, when developed by coupling, are essentially unaffected by further exposure to light or other actinic radiation and hence are capable of forming permanent visible images.

Hence, by incorporating a diazo layer on or in a support such as a sheet of paper, film base, or the like, a means is provided by which an original image may be photographed on the sheet. The composition incorporated into or placed upon the sheet is preferably one which is initially soluble in water. Preferably, an aqueous solution of the diazo material is weakly acidified, as by means of certain organic or other weak acids, for example, citric acid, tartaric acid, boric acid and the like. Auxiliary chemical compounds also may be dissolved in the solution, along with the acidic diazo and coupling components. Together, these ingredients will yield a light sensitive coating solution. After application of such solution to the support base, a paper sheet for example, the moisture may be removed to leave the active chemicals in situ.

When a sheet treated as above is exposed to the action of appropriate actinic radiation, for example ultra-violet light, through a layer of material which is transparent to such radiation, opaque image portions of said layer will prevent the inactivation by the radiation of the diazo compound underlying them. As a result, the diazo compound in exposed areas is destroyed but where protected by the opaque image portions of the original it is not affected. Thereafter, by placing the exposed sheet in an alkaline environment, e.g., on exposure to ammonia vapor, or by causing an evolution within such sheet, or within a coating thereon of an alkaline reagent such as ammonia vapor, or by treating the surface with an aqueous solution of such a reagent, or treating with any composition including a liquid or gaseous alkaline agent, coupling takes place. The coupling compound, under the alkaline conditions, combines with the remaining and still active portions of the diazo compound in the unexposed areas. The result is that such unexposed areas are converted to permanent dyes. Hence, there is formed an exact and positive reproduction on the sheet of the image carried by the original through or upon which the radiation was exposed.

The development of a photographic sheet, exposed in the manner just described, normally requires a certain amount of heat. In a preferred form of the present invention, where a material capable of generating the required alkaline agent is also incorporated into the sheet or its coating, heat may be applied to release or generate the alkaline agent, for example, ammonia gas. When this occurs, the development will take place. Under such conditions there is no necessity of subjecting the sheet to immersion in liquids or even to flowing a further quantity of gaseous ammonia over its surface. On the other hand, even where gaseous ammonia or the equivalent is used, it is desirable and often necessary to apply heat of a certain controlled intensity.

In the process just described, and in other processes which depend upon temperature effects or controlled heating for the desired development, it is obviously essential to have an apparatus capable of applying the right amount of heat at the right temperature and for a suitable period of time. It is obviously desirable that such apparatus be simple, be relatively inexpensive, and be small and compact, particularly when it is to be used in office systems and the like.

Hence, it is an object of the present invention to make available a simple, effective heating device for developing copy materials in the manner described in general terms above. An ancillary object is to provide an improved method by which copy sheets and other photographic materials may be promptly developed by thermal means, with a minimum of expense and effort.

A further object is to devise a simple and effective apparatus for handling sheet material at a rapid rate and applying the optimum heat thereto during passage through the apparatus. A related object is to devise an improved method of controlling the application of heat to separate sheets or to web material, where it is essential that the quality and duration of the heat be controlled with a high degree of accuracy.

A still further object involves the development of prints on sheet material carrying self-developing coatings in a manner which minimizes the handling difficulties normally associated with the operation in the prior art. Additional objects involve an improved method of developing permanently visible images in or on an exposed sheet of the diazo type by directly applying controlled heat for an optimum period to bring out an image. This is accomplished without danger of over- or under-development due to inherent instability, typical in the prior art, of the heating system and of the diazo type materials passed therethrough.

Further objects are to apply the required heat universally and uniformly over the entire surface of sheet or web material passing therethrough to accomplish efficient development without the necessity of immersion in liquid or gaseous developing agents.

Another object is the provision of more efficient results in developing latent diazo images with thermal energy with a minimum of heat loss.

Other objects and advantages are apparent from the following detailed description taken in conjunction with the attached drawings in which.

The present invention finds application in diazo type apparatus for making duplicate copies of originals by means of a diazo copy paper having a diazo coating which is reactive to ultra-violet radiation to form a latent thermal diazo image which is developed by heat into a visible image. Such apparatus includes a first radiation source having a spectral quality predominantly in the ultra-violet range which irradiates a first surface, a second radiation source having a spectral quality in the infra-red range which irradiates a second surface and means for passing said copy paper in contact with the original over the first surface to subject the copy paper to ultra-violet radiation to thereby form a latent thermal diazo image on the copy paper and means for subsequently passing said copy paper over the second surface to subject the latent thermal diazo image on said copy paper to heat thereby developing said latent thermal diazo image into a visible image. The present invention is specifically concerned with the second radiation source and the second surface.

Figure 1:
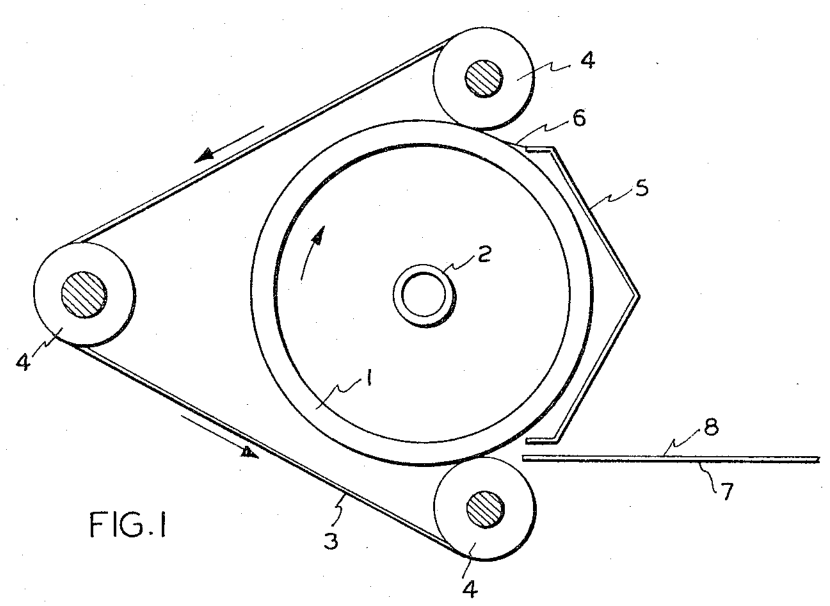
FIG. 1 is a schematic representation of a thermal developing device.

Referring to FIG. 1, there is shown a cylinder 1 made of a material which is highly absorptive of radiations in the infra-red range such as emitted from an infra-red heat source 2 disposed within said cylinder. The ends of the cylinder are closed in the usual manner and a high temperature endless belt 3 is mounted by means of the three rollers 4 so as to contact the larger portion of the external surface of cylinder 1. A reflector 5 is mounted adjacent to the free surface of cylinder 1 in such manner as to reflect infra-red radiations passing from heat source 2 through cylinder 1. A cylinder pick-off 6 is disposed closely adjacent to the upper surface of cylinder 1 so as to assist in removing copy paper from said cylinder after it has passed around said cylinder. Copy paper 7 is shown entering the nip between cylinder 1 and belt 3 on lower roller 4 at the lower end of said cylinder. The copy paper 7 has a sensitized upper surface 8 carrying a latent thermal diazo image formed by previous contact of said copy paper with an original and conjoint exposure to ultra-violet radiation. As the paper 7 passes into the nip between belt 3 and cylinder 1, the belt 3 urges said copy paper into intimate contact with the external surface of cylinder 1, thereby exposing the latent thermal diazo image on side 8 thereof to the heat emanating from heat source 2 and passing through cylinder 1. This heat converts the latent thermal diazo image into a visible image and the copy paper is expelled from between the belt 3 and cylinder 1 at the upper end of said cylinder. The reflector 5 returns a considerable amount of infra-red radiations passing through cylinder 1 at the side opposite the belt 3, which radiations, ordinarily, would be lost.

Figure 2:
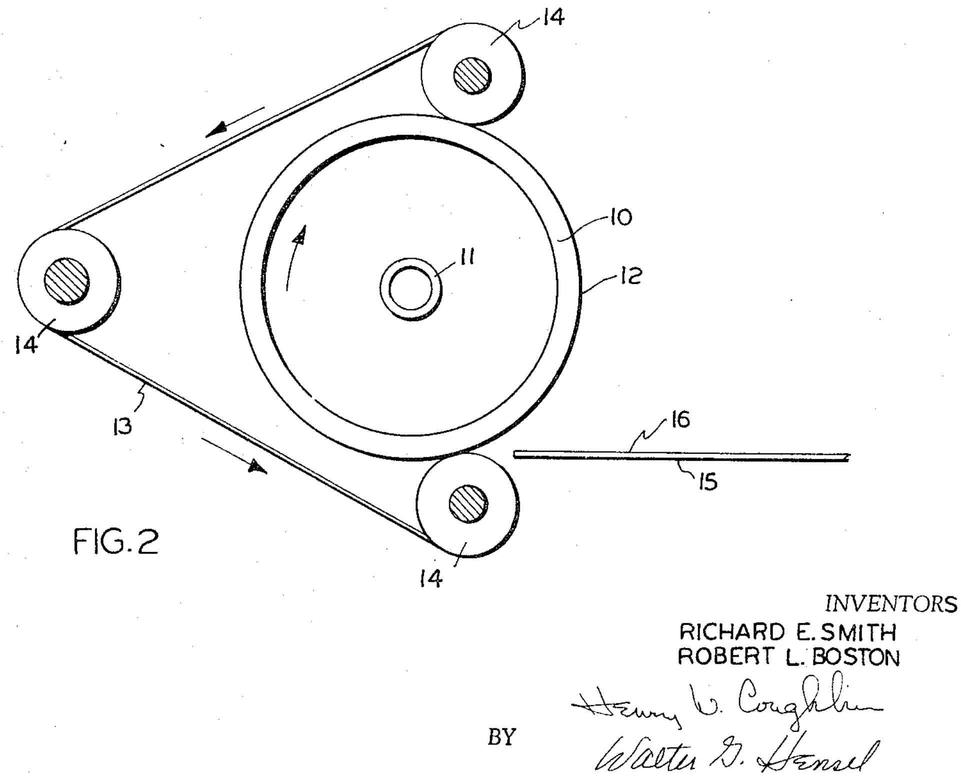
FIG. 2 is a schematic representation depicting a second thermal developing device which is under this invention.

Referring now to FIG. 2, there is shown a cylinder 10 made of a material which is highly absorptive of the radiations produced by an infra-red heat source 11 mounted within said cylinder. The cylinder also is provided with an external infra-red reflective coating 12. The coating 12 is of any suitable thickness which will permit rapid heat transfer while at the same time providing substantial durability and adequate infra-red reflectivity. For example, the coating 12 is preferably .0001 to .0005 inch thick. Suitable material which can be used in forming the infra-red reflective coating 12 is a dichroic coating. Such a coating is prepared by depositing alternate layers of high and low refractive index in the infra-red region under high vacuum on a suitable substrate material. Selected interference of the light reflected from the interfaces of the multilayer dielectric films divides the near infra-red into regions of high and low transmittance. By careful manipulation of the deposition process the optical properties of the dielectric layers can be controlled to reflect and transmit selectively over varied wave lengths. Either this dichroic coating or the use of infra-red absorbing glass would provide for better utilization of infra-red energy as usable heat.

The high temperature endless belt 13 is caused to intimately contact the major portion of the external surface of cylinder 10 by means of rollers 14. Thermal diazo copy paper 15 is shown in FIG. 2 in a position about to enter the nip of cylinder 10 and belt 13 at the lower end of said cylinder. Copy paper 15 has a latent thermal diazo image on its upper side 16. When copy paper 15 enters the nip between belt 13 and cylinder 10, the belt 13 forces said copy paper into intimate contact with the coating 12 which transmits heat from the infra-red heat source 11 to the latent thermal diazo image on side 16 of said paper to develop said image into a visible image. Thereafter, the developed copy paper exits from between the belt 13 and upper roller 14 at the upper side of the cylinder 10.

In the apparatus shown in FIGS. 1 and 2, the cylinders 1 and 10 can be separately rotatably driven by the usual known means and/or the endless belts 3 and 13 can be separately driven by the usual known means. As a further alternative, the belts 3 and 13 can provide the driving force for cylinders 1 and 10, respectively. The cylinders 1 and 10 are preferably made of such materials as Pyrex glass which has a higher specific heat than such materials as aluminum or brass and, therefore, have a higher heat capacity. Consequently, glass such as Pyrex can reach and maintain much higher temperatures than metallic materials such as aluminum or brass.

It will be obvious that various additional modifications may be made in the apparatus and it is intended to cover such modifications by the claims which follow, as far as the prior art properly permits.

What is claimed is:

1. In a diazo type apparatus for making duplicate copies of originals by means of copy paper reactive to ultra-violet radiation to form a latent thermal image which is developed by heat to form a visible image, comprising, a first radiation source having a spectral quality predominantly in the ultra-violet range which irradiates a first surface, a second radiation source having a spectral quality in the infra-red range which irradiates a second surface, means for passing said copy paper in contact with an original over said first surface thereby subjecting it to radiation of said first spectral range and thereafter passing said paper over said second surface thereby subjecting it to heat of said second radiation source, that improvement in said second surface comprising a cylinder of a material which is highly absorptive of the radiation of said second radiation source, and wherein said second radiation source is disposed within said cylinder and an infra-red reflector is disposed externally of said cylinder for reflecting radiations from said second radiation source back into said cylinder and a high temperature endless belt is disposed in contact with the larger portion of the outer surface of said cylinder for intimately contacting said copy paper with said outer surface.

2. Apparatus as claimed in claim 1 wherein said reflector is an infra-red radiation reflective coating disposed on the external surface of said cylinder.

3. The apparatus as claimed in claim 2 wherein said coating is a dichroic coating.

4. Apparatus as claimed in claim 2 wherein said reflective coating is .0001 to .0005 inch thick.

References Cited by the Examiner

UNITED STATES PATENTS

| | | | |
|---|---|---|---|
| 3,012,141 | 12/1961 | Thomiszer | 95—89 X |
| 3,086,100 | 4/1963 | Carrozza | 95—94 X |
| 3,189,729 | 6/1965 | Lusebrink | 34—41 X |

FOREIGN PATENTS

| | | |
|---|---|---|
| 177,307 | 3/1922 | Great Britain. |

NORTON ANSHER, *Primary Examiner.*

CLIFFORD B. PRICE, *Examiner.*